United States Patent [19]
Borgato et al.

[11] Patent Number: 5,508,602
[45] Date of Patent: Apr. 16, 1996

[54] VOLTAGE BOOSTING CIRCUIT WITH LOAD CURRENT SENSING

[75] Inventors: Pierandrea Borgato, Lomagna; Claudio Diazzi, Milan; Albino Pidutti, Udine, all of Italy

[73] Assignee: SGS-Thomson Microelectronics, S.r.l., Agrate Brianza, Italy

[21] Appl. No.: 128,791

[22] Filed: Sep. 28, 1993

[30] Foreign Application Priority Data

Sep. 28, 1992 [EP] European Pat. Off. .............. 92830530

[51] Int. Cl.[6] .................................................. G05F 1/625
[52] U.S. Cl. ............................................ 323/222; 323/287
[58] Field of Search ...................... 323/222, 265, 323/266, 273, 282, 318, 285, 299, 351, 287

[56] References Cited

U.S. PATENT DOCUMENTS

| | | | |
|---|---|---|---|
| 4,709,322 | 11/1987 | Mirow | 363/86 |
| 4,825,351 | 4/1989 | Uesugi | 323/222 X |
| 4,942,509 | 7/1990 | Shires et al. | 323/222 X |

FOREIGN PATENT DOCUMENTS 2198561  11/1987  United Kingdom .
2213614   1/1989  United Kingdom .

OTHER PUBLICATIONS

Power Conversion, Oct. 1989 Proceedings, p. 110, "Control IC for Near Unity Power Factor in SMPS", by Herman Neufeld.

Primary Examiner—Peter S. Wong
Assistant Examiner—Y. Jessica Han
Attorney, Agent, or Firm—Robert Groover; Betty Formby

[57] ABSTRACT

A power supply in which control of the switch-on instant of a power device of a boost-circuit (operating in a discontinuous mode) is implemented by monitoring the current which actually flows through the "fly-back" inductance. The current is monitored on a sensing resistance, and, by the use of a comparator, a signal is produced for enabling/disabling the transfer to an input of a PWM driving circuit of a switch-on signal produced by a null detector. This configuration provide good noise immunity, which is particularly useful in power-factor-correction applications, and reduced power dissipation.

22 Claims, 2 Drawing Sheets

VOLTAGE BOOSTING CIRCUIT WITH LOAD CURRENT SENSING

CROSS-REFERENCE TO RELATED APPLICATION

This application claims priority from European App'n 92830530.9, filed Sep. 28, 1992, which is hereby incorporated by reference.

BACKGROUND AND SUMMARY OF THE INVENTION

The present invention relates to a switching power supply circuit destined to function in a discontinuous mode, i.e. with a momentary nullification of the current through a "fly-back" inductance between successive impulses. More particularly the invention relates to an improved system for controlling the switching-on of a power device whereby besides reducing power consumption, a higher reliability and immunity to noise of the circuit are also achieved.

A switching power supply, commonly based on a so-called boost-type circuit utilizing a fly-back inductance, provides an output DC voltage having a value greater than the value of the input voltage, i.e. of the value of the rectified line voltage. During each switching cycle, such a "fly-back" inductance alternately absorbs energy from the "low" voltage side (i.e. through the terminal connected to the rectified line voltage) during a conducting phase of the power device (transistor), and thereafter, following the switching-off of the power transistor (i.e. conduction taking place through an output diode), it gives back the energy stored in the inductance at the output voltage, releasing it to an application circuit connected thereto (i.e. whatever circuit or subsystem uses the generated voltage Vout). If for any reason the output voltage becomes lower than the rectified line voltage, the circuit operates under anomalous conditions which, under certain circumstances, may lead to failure.

Commonly these systems function according to one of two alternative modes of operation in relation to the variation of the current which circulates in the fly-back inductance during each switching cycle is concerned.

According to a first technique ("continuous" or "hysteretic" mode), the current across the inductance is made to vary between two limit values of the same sign, different from each other by not more than about ten or more percentage points, as referred to the amplitude of the rectified waveform. This first technique is preferred for high-power systems, because, for a given power, the introduction of electromagnetic interference in the line may be contained by employing a relatively inexpensive filter circuit, though requiring a more sophisticated switching circuit. In practice the current flowing through the inductance has a high frequency saw-tooth waveform having a relatively small amplitude (ripple).

By contrast, an alternative technique ("discontinuous" mode) is widely employed in power supplies of relatively low power, typically up to one or two hundred watts. The current that circulates in the fly-back inductance is made to vary, during each switching cycle, between zero and a maximum value which follows the envelope of the rectified waveform.

The cost of the relative switching circuit is less than in the preceding case, while the cost of the circuit necessary for filtering the disturbances which would otherwise be introduced into the network remains economically tolerable because of the relatively low current and power levels. A simplified diagram of a power supply of this latter type is shown in FIG. 1.

In the case of this second technique it is possible to optimize the conversion efficiency by exploiting the fact that the power device Pw may be switched-on when the current through the fly-back inductance L is null.

In practice the amount of energy that would be lost in the switching power transistor Pw when, upon switching-on, it must dissipate the energy stored in the parasitic capacitance Cp that exists between the circuit node connected to the drain (collector) terminal and ground, may be significantly reduced. In the case of the first technique (continuous mode) the drain voltage before the switching-on of the power transistor is equal to the output voltage and because the drain is forced by the switching-on process to ground potential, for each cycle an energy equal to: $½CpV_{out}^2$, where $V_{out}$ is the output voltage is dissipated through a discharge of the parasitic capacitance Cp. However, in the case of the second technique (discontinuous mode), it is possible to reduce this power dissipation. This is often obtained by slightly delaying the switching-on of the power transistor. Instead of switching-on the power transistor as soon as the current flowing through the fly-back inductance toward the output circuit Co through the diode Dr has become null, a certain progress of a resonance process of the inductance L with the parasitic capacitance Cp is available. Therefore, the parasitic capacitance Cp discharges in a nondissipative mode from the output voltage level $V_{out}$ to the input voltage level $V_{in}$, which is significantly lower than $V_{out}$.

When the power transistor Pw finally switches-on again it must dissipate an energy equal to: $½CpV_{out}^2$, which is less than that of the case described before, by a proportion given by: $V_{in}^2/V_{out}^2$.

Therefore, a switch-on signal is commonly obtained by detecting, on a dedicated secondary winding Ls magnetically coupled to the fly-back inductance L, a condition of null voltage across the secondary winding Ls.

A switch-off signal for the power device (transistor) is normally obtained through a comparison between a reference signal (which may e.g. be purposely generated within a PWM driving circuit), and the current which flows through the power device Pw, which is commonly read on a sensing resistance (Rsense) connected in series with the power transistor Pw. When the sensed current reaches a reference threshold, the power transistor is turned-off.

That is, the rectified line voltage $V_{in}$ is substantially present on the node C, while on the other terminal of the fly-back inductance L, i.e. on the D node, a square wave voltage is present that takes a substantially null value when the power transistor Pw is conducting, and a $V_{out}$ value (i.e. the output voltage of the power supply) when the power transistor Pw is not conducting. Therefore, the voltage signal that is induced on the secondary winding Ls, i.e. the voltage present on the node A, has a waveform that is enveloped at the top and at the bottom by a sinusoid, as depicted in FIG. 2a. This voltage signal, through the resistance R1, is fed to a clipping circuit composed of the transistor Q1, the bias current generator Ib, the pair of series connected diodes D1 and D2, and the Zener diode DZ1, as shown in FIG. 1. This circuit limits the amplitude of a signal that is a replica of the voltage induced on the secondary winding Ls, on the node B (i.e. output node of the clipping circuit), as represented in FIG. 2b. This limited (clipped) voltage signal is compared with a reference voltage (schematically indicated in FIG. 1 by a battery symbol) by the comparator COMP, capable of producing a switch-on signal for the power device Pw that is sent to an input of a PWM driving circuit.

To help clarify this point, attention is drawn again to the circuit of FIG. 1 and to the signal waveforms shown in FIGS. 2a, 2b, 2c and 2d.

The minimum value of the sinusoid which envelopes at the top the signal representing the voltage present on the node A (i.e. the voltage induced on the secondary winding Ls) is given by:

$$Vmin=(V_{out}-V_{in})/K,$$

where K is the L/Ls transformer ratio. When Vmin is lower than the upper threshold of the clipping circuit, the voltage on the node B will shows a "valley", as depicted in FIG. 2b, and this valley expands upon an increase of the $V_{in}$ value. When finally $V_{in}$ becomes greater than $V_{out}$, Vmin becomes negative, thus determining a situation similar to the one depicted in FIG. 2c. As may be observed in the central zone of FIG. 2c, the valley may grow to completely nullify the signal, and, as a consequence, the output of the comparator COMP will remain high as depicted in FIG. 2d.

In these conditions, as depicted in the central zones of the FIGS. 2b, 2c, and 2d, it is easily recognized that any noise or spurious spike that may superimpose to the waveform of $V_{in}$, may simulate spurious transitions of the represented signal. In fact, it is the positive or negative transitions, as referred to the sense of the magnetic coupling of the secondary winding Ls with the fly-back (primary) winding L, that identify the instant when the voltage across the fly-back inductance drops from $V_{out}-V_{in}$ to zero, and which accordingly are utilized for generating a switch-on signal for the power transistor Pw.

Thus, it may be seen that these prior art circuits have a drawback that is represented by the fact that it is possible that a spurious disturbance in the rectified line voltage (input voltage), by transferring itself to the secondary winding Ls, may simulate a transition and therefore cause the switching-on of the power transistor Pw before the current through the fly-back inductance L has effectively dropped to zero.

This risk is particularly present in some particular types of circuits, such as in switching power supplies with a PWM control circuit and where a control upon the power factor is also implemented. (Electronic power factor correction is an area of increasing demand for technological solutions. See, e.g., Neufeld, "Control IC for Near Unity Power Factor in SMPS," POWER CONVERSION (OCTOBER 1989 PROCEEDINGS) pp. 110ff, which is hereby incorporated by reference. Additional materials are included in the appendix to the present application, which is hereby incorporated by reference.) In these circuits the input voltage $V_{in}$ is:

relatively unfiltered after rectification (due to the need for not reactively loading the line); and variable from zero (which makes particularly effective the technique of delaying the switching-on of the power transistor described above) up to a maximum value that is close to the value of the output voltage (which on the other hand makes a spurious switching-on of the power transistor extremely dangerous) for each half-cycle of the line frequency.

A particularly critical situation occurs when the rectified line sinusoid reaches its maximum. In the neighborhood of these maxima:

the input voltage becomes nearly equal to the output voltage (FIG. 2b), or, in case of an r.m.s. value and/or form factor greater than the design maxima, becomes greater than the output voltage (FIG. 2d); and during each switching cycle more factors of risk combine together:

the duration of the conduction period of the power transistor Pw shortens and that of nonconduction lengthens, thus increasing the proportion of a cycle when the occurrence of a spurious switching-on may be possible;

the current at which the switching-off occurs is relatively high and a spurious switching-on may occur while the fly-back inductance L still stores a relatively high energy;

the voltage across the fly-back inductance L during the "fly-back" period (power transistor off) is at minimum value and a disturbance may easily induce a spurious sensing of a transition.

Notably in these systems, the current flowing in the fly-back inductance has a substantially triangular wave shape (in practice the shape of a nonisosceles triangle of variable aspect), the amplitude of which varies from zero to a maximum that is enveloped by the rectified half-wave of the line voltage ($V_{in}$). During the rising portion of this waveform, the current flows through the power transistor Pw; during the falling portion the current flows through the output diode to the application circuit. In these cases, it is important to prevent the transistor Pw from being erroneously switched-on again when the current which flows through the fly-back inductance (and the output diode Dr and the application circuit) is at a relatively high level.

It is therefore a main objective of the present invention to provide an improved control circuit for the switching-on of the power element of a boost-type circuit, free of the drawbacks of the known circuits, thus making a switching power supply more immune to disturbances and therefore more reliable in its operation.

These objectives and advantages are obtained, in the control system provided by the innovative teachings disclosed herein, by monitoring through a sensing resistance that is purposely connected in series with the output circuit (i.e. with the application circuit and not with the power transistor, as was commonly the case in the circuits of the prior art), not the current which flows through the power transistor but the current which flows through the fly-back inductance.

The control system of the invention prevents the transfer of a switch-on signal, as generated by elaborating the signal present across a secondary winding magnetically, coupled with the winding (primary) of the fly-back inductance, to a Pulse-With-Modulation (PWM) driving circuit, as long as a current flowing through the fly-back inductance is detected. It should be noted that this does not alter the sensing of the optimum instant for switching-off the power transistor by the PWM driving circuit. In this way, not only the power dissipation associated with the discharge of the parasitic capacitance that is intrinsic to the structure of the power device (transistor), is reduced, but also the risks of an anticipated switching-on of the power transistor, which may be caused by noise or spurious events propagating on the line, are eliminated. Avoidance of such spurious activation results in (among other advantages) avoidance of efficiency loss.

The circuit provided by the disclosed invention is particularly useful when the line voltage has a relatively high form factor or presents noise spikes, as well as in all those instances when the output voltage, because of a certain variation of the load of the power supply, is subjected to a so-called "under-shoot" phenomenon, as related to the design regulated output voltage. The latter phenomenon is practically inevitable when the switching power supply is provided with means for implementing also a function of control on the power factor (PFC).

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
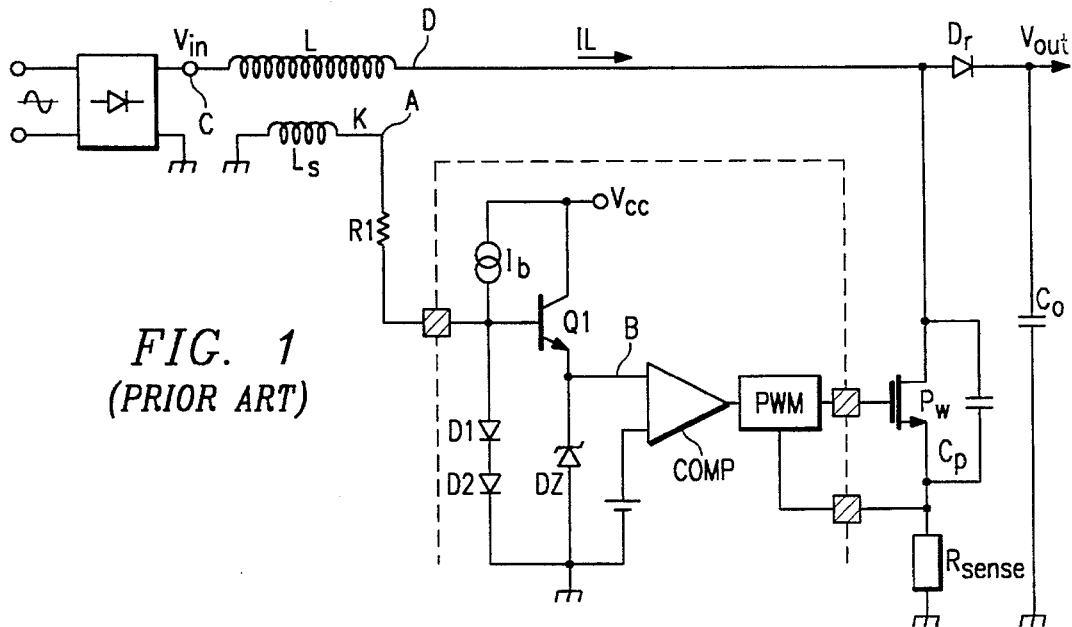
FIG. 1 is a basic diagram of a control circuit for the switching-on of a power device, according to the prior art as discussed above.
Figure 2A:
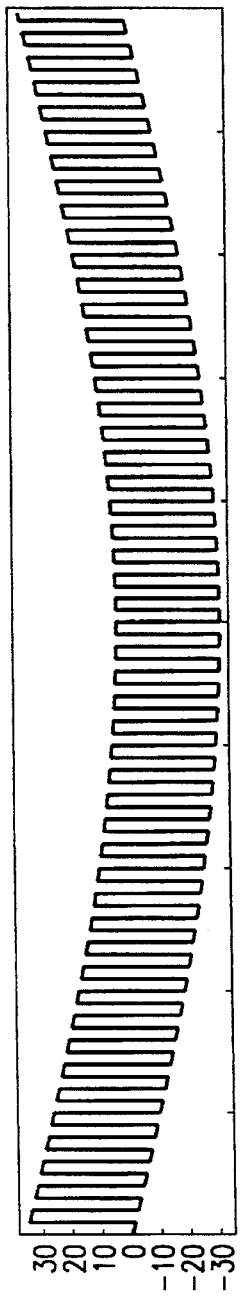
FIGS. 2a, 2b, 2c, and 2d show the wave shapes of signals pertaining to the description of the problems of the circuit of FIG. 1.
Figure 2B:
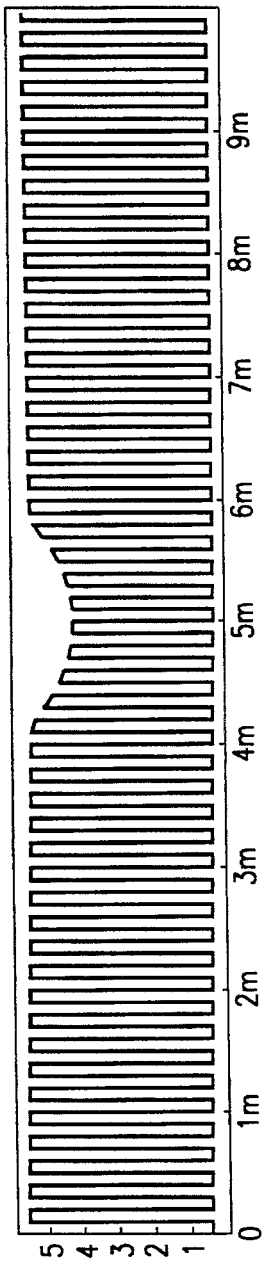
Figure 2C:
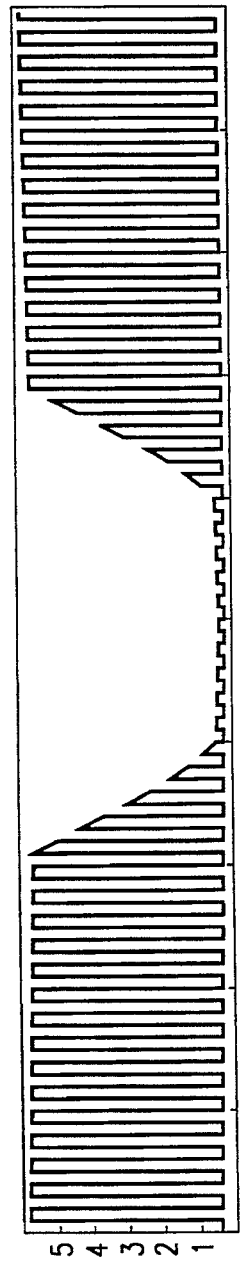
Figure 2D:
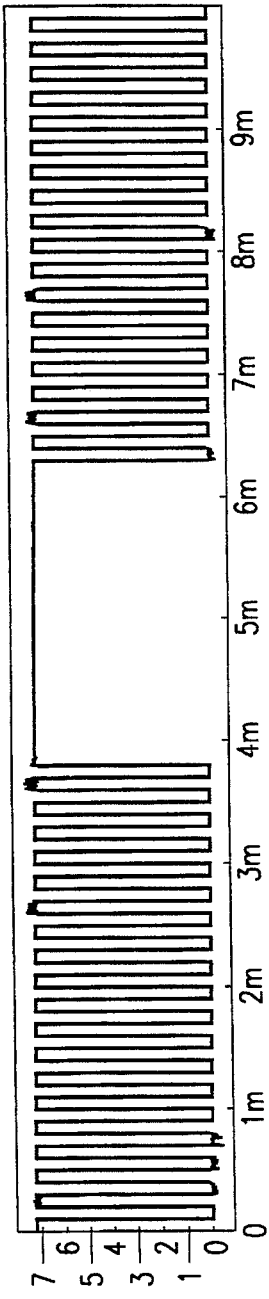

The general operation of known circuit types, and of systems to which the circuit of the present invention is particularly applicable, have been described in great detail above. Moreover, the waveforms of FIGS. 2a–2d have illustrated some of the problems encountered in a boost circuit, and particularly in a boost circuit for power-factor-control applications. The notable features of the preferred and innovative embodiment of FIG. 3 will now be described in detail. However, it should be noted that the foregoing description of FIGS. 1–2d provides background context which is useful in understanding the operation and advantages of the innovative circuit of FIG. 3.

Figure 3:
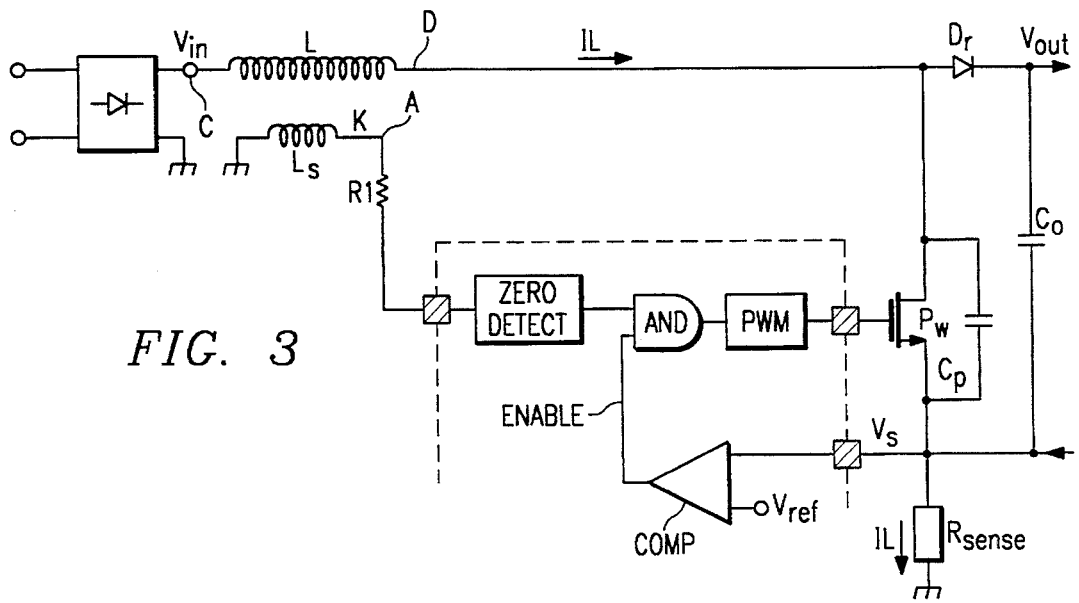
FIG. 3 is a basic diagram of a circuit made in accordance with the present invention.

With reference to FIG. 3, a circuit for controlling the switching-on of a power transistor Pw of a boost-type power supply circuit, made according to the present invention, comprises a null detector circuit 0-DETECT, a comparator COMP and a logic AND gate. Of course, the circuit for controlling the instant of switching-on of the power transistor and the relative PWM driving circuit may be integrated on a single chip, as indicatively shown in FIG. 3 by the dash line perimeter and by the relevant pins for connecting the integrated circuit to the external components of the power supply circuit.

As may be observed, the current IL that flows through the fly-back inductance L of the circuit flows also through the sensing resistance Rsense during all phases of operation of the power supply circuit. Therefore, across the sensing resistor Rsense a voltage Vs proportional to the value of the current IL, is available. Through a comparison of such a voltage Vs with a reference voltage Vref, implemented by the use of the comparator COMP, an ENABLE signal is produced that enables or disable the logic AND gate that transfers a signal commanding the switching-on of the power transistor Pw to an input terminal of the pulse width modulation driving circuit PWM. The reference voltage Vref sets the condition for enabling the switching-on of the power device Pw when IL drops below a certain safety value.

The PWM circuit has the function of providing a switching signal to the gate of the power device. In general the PWM signal can be both frequency and duty-cycle variable, depending on the specific implementation of the control loop which is chosen for a given application. However, the implementation of the PWM block is not particularly relevant to the innovative circuit.

A switch-on signal is actually produced by the null detector circuit 0-DETECT whenever the voltage on the node A becomes null; however this signal is not transferred to the PWM driving circuit until the AND gate is enabled.

In the presently preferred embodiment (as may be seen from the figures), the application circuit powered by the power supply of the invention will have as reference common potential a virtual ground potential that is equivalent to the voltage present on the sensing resistance Rsense. In general, this peculiarity of the circuit of the preferred embodiment will not create any problem.

A sample implementation may use the following specific parameters. (Of course these are merely illustrative, and do NOT delimit the scope of the invention.)

| | |
|---|---|
| Line voltage | 110/220 V |
| Output voltage | 400 V DC |
| Output power | 100 W |
| Switching frequency (average) | 50 KHz |
| Inductance L | 15 mH |
| Inductance of secondary winding Ls | 15 µH |
| Resistance R1 | 47 KΩ |
| Resistance Rsense | 1Ω. |

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The disclosed power supply can be used in many applications. However, it is envisioned that this power supply may be particularly advantageous within a boost converter for implementing power-factor correction.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A circuit for controlling the switching-on of a power device of a boost-type power supply circuit comprising a fly-back inductance connected between an input node to which a rectified line voltage is fed and said power device, a secondary winding coupled to the winding of said fly-back inductance, a sensing resistance of the current flowing in said fly-back inductance, functionally connected between said power device and a ground node of the circuit and a pulse width modulation circuit driving said power device, comprising a null detector circuit capable of producing on an output node a first logic signal representative of a null value condition of a voltage induced on said secondary winding;

a comparator capable of producing at an output node a second logic signal for enabling the switching-on of the power device and having a first input functionally connected to a connection node of said sensing resistance to said power device and a second input functionally connected to a reference voltage; and a logic AND gate having a first input connected to the output of said null detector circuit, a second input connected to the output node of said comparator and an output connected to an input of said pulse width modulation circuit;

an application circuit powered by said power supply being functionally connected between an output node of said power supply circuit and said connection node between said power device and said sensing resistance.

2. The circuit of claim 1, further comprising an output capacitor connected to said output node.

3. The circuit of claim 1, wherein said power device is a field-effect transistor.

4. The circuit of claim 1, wherein said sensing resistance has a value of about one ohm.

5. A method for controlling the switching-on of a power device driven by a pulse width modulation circuit of a boost-type switching power supply comprising a fly-back inductance connected between an input node to which a rectified line voltage is fed and said power device, comprising the steps of:

producing a first switch-on signal whenever the voltage across a secondary winding coupled to the winding of said fly-back inductance is null;

generating a second switch-on enabling signal whenever the current in said fly-back inductance drops below a preset level;

producing a third logic AND signal of said first and said second signals; and feeding said third logic signal to an input of said pulse width modulation circuit driving said power device.

6. A power supply circuit, configured to be supplied from first and second power input terminals, comprising:

first and second output connections for supplying power to an application circuit;

a power transistor having
a first current-carrying terminal operatively connected, through an output diode, to said first output connection, and
a second current-carrying terminal operatively connected to said second output connection;

a fly-back inductance connected between said first input terminal and said first current-carrying terminal of said power transistor;

a secondary winding inductively coupled to said fly-back inductance;

a sensing resistance connected between said second output connection and said second input connection;

a pulse width modulation circuit connected to drive a control terminal of said power transistor;

a null detector circuit connected to said secondary winding, and configured to provide an output which indicates when the voltage induced on said secondary winding crosses zero;

a comparator connected to monitor the voltage across said sensing resistance, and to provide an output accordingly;

a logic gate connected to combine the outputs of said comparator and said null detector, and to activate said pulse width modulation circuit accordingly.

7. The circuit of claim 6, further comprising an output capacitor connected to said output diode.

8. The circuit of claim 6, wherein said power transistor is a field-effect transistor.

9. The circuit of claim 6, wherein said first input terminal is connected to receive a rectified line voltage.

10. The circuit of claim 6, wherein said sensing resistance has a value of about one ohm.

11. A power supply circuit, configured to be supplied from first and second power input terminals, comprising:

first and second output connections for supplying power to an application circuit;

a power transistor having
a first current-carrying terminal operatively connected, through an output diode, to said first output connection, and
a second current-carrying terminal operatively connected to said second output connection;

a fly-back inductance connected between said first input terminal and said first current-carrying terminal of said power transistor;

a pulse width modulation circuit connected to drive a control terminal of said power transistor;

a null detector circuit operatively connected to detect the current in said inductance, and configured to provide an output which indicates when the current through said inductance zero;

a comparator operatively connected to monitor the current through the application circuit, and configured to provide an output which indicates whenever the current through the application circuit has fallen below a target level; and a logic gate connected to combine the outputs of said comparator and said null detector, and to activate said pulse width modulation circuit accordingly.

12. The circuit of claim 11, further comprising an output capacitor connected to said output diode.

13. The circuit of claim 11, wherein said power transistor is a field-effect transistor.

14. The circuit of claim 11, wherein said first input terminal is connected to receive a rectified line voltage.

15. The circuit of claim 11, further comprising a sensing resistance connected between said second terminal of said power transistor and said second power input terminal, said comparator being operatively connected to monitor the voltage across said sensing resistance.

16. The circuit of claim 15, wherein said sensing resistance has a value of about one ohm.

17. A power supply circuit, configured to be supplied from first and second power input terminals, comprising:

a power transistor having
a first current-carrying terminal operatively connected to said first input terminal through a fly-back inductance, and to a power output connection through an output diode, and a second current-carrying terminal operatively connected to said second input connection;

a pulse width modulation circuit connected to drive a control terminal of said power transistor;

a null detector circuit operatively connected to detect the current in said inductance, and configured to provide an output which indicates when the current through said inductance zero;

a comparator operatively connected to monitor a value which indicates the voltage applied at said power output connection, and to provide an output which indicates when the voltage of said power connection has fallen below a target level; and a logic gate connected to combine the outputs of said comparator and said null detector, and to activate said pulse width modulation circuit accordingly.

18. The circuit of claim 17, further comprising an output capacitor connected to said output diode.

19. The circuit of claim 17, wherein said power transistor is a field-effect transistor.

20. The circuit of claim 17, wherein said first input terminal is connected to receive a rectified line voltage.

21. The circuit of claim 17, further comprising a sensing resistance connected between said second terminal of said power transistor and said second power input terminal, said comparator being operatively connected to monitor the voltage across said sensing resistance.

22. The circuit of claim 21, wherein said sensing resistance has a value of about one ohm.

* * * * *